United States Patent [19]

Lewis, Richard Newton

[11] 3,925,285
[45] Dec. 9, 1975

[54] ANTISTRUCTURE AGENT

[75] Inventor: Lewis, Richard Newton, Tecumseh, Mich.

[73] Assignee: SWS Silicones Corporation, Adrian, Mich.

[22] Filed: June 20, 1974

[21] Appl. No.: 481,006

[52] U.S. Cl.. 260/29.1 SB; 260/37 SB; 260/46.5 R; 260/46.5 G
[51] Int. Cl.² .......................................... C08G 77/04
[58] Field of Search ...... 260/46.5 R, 46.5 G, 37 SB, 260/29.1 SB

[56] References Cited
UNITED STATES PATENTS

| | | | |
|---|---|---|---|
| 3,328,340 | 6/1967 | Vaughn, Jr. | 260/46.5 G |
| 3,551,382 | 12/1970 | Schnurrbusch et al. | 260/46.5 G |

Primary Examiner—Melvyn I. Marquis

[57] ABSTRACT

An antistructure agent consisting essentially of hexamethyltrisiloxanediol and methoxyhexamethyltrisiloxanol is prepared by reacting hexamethylcyclotrisiloxane with water, methanol and a short-chain fatty acid. It is very effective in preventing structure buildup in silicone elastomers.

2 Claims, No Drawings

ANTISTRUCTURE AGENT

Short-chain siloxanediols are often used as antistructure agents or "softeners" in silica-filled silicone elastomers. They associate strongly with the filler particles and thus prevent or minimize association of the silicon polymer with the filler, which otherwise leads to a gradual buildup of "structure" or "crepehardening." "Structure" in such a case is a three-dimensional network that interferes with easy processing of uncured elastomers, and is very undesirable.

Compounds which have been used as softeners are alphaomega-siloxanediols of the general formula $HO[(CH_3)_2SiO]_xH$, in which x is in the range of from 10 to 20. Also, alpha-alkoxy-omega-siloxanols of the formula $RO[(CH_3)_2SiO]_yH$, where R is a short-chain alkyl radical and y is in the range of 3 to 5, are also effective as antistructure agents (see U.S. Pat. No. 3,799,962). The effectiveness of these antistructure agents increases as the hydroxyl content increases, i.e., as the chain length in either series decreases. Unfortunately, very short-chain siloxanediols are difficult to obtain.

Therefore, it is an object of this invention to provide a method for producing a mixture of short-chain alpha-omega-siloxanediols and short-chain alpha-alkoxy-omega-siloxanols. Another object of this invention is to provide a method for producing a mixture consisting essentially of hexamethyltrisiloxane-1,5-diol and 1-methoxy-hexamethyl-trisiloxane-5-ol. A further object of this invention is to provide a novel antistructure agent that is effective at low concentrations in a silica-filled silicone elastomer.

These objects and others are achieved, generally speaking, by hydrolyzing hexamethylcyclotrisiloxane ($D_3$) with water in the presence of methanol and a weak acid catalyst, if desired.

Hydrolysis of $D_3$ has not been practical in the past because water and $D_3$ are not appreciably miscible, even at temperatures above the melting point of $D_3$, which is about 65°C. Hydrolysis under drastic conditions, e.g., with strong acids, or with water heated under pressure above 100°C. may be accomplished, but invariably leads to a polymer with a low hydroxyl content. Comparable results are obtained if a mutual solvent of low to medium polarity, such as acetone or tetrahydrofuran, is employed.

Methanol, a solvent of high dielectric constant, unexpectedly permits hydrolysis to proceed readily under mild conditions, with relatively little involvement of the methanol. Even if a large molar excess of methanol is employed to assure complete homogeneity, the proportion of siloxanediol produced is usually at least equal to that of the methoxysiloxanol. The trisiloxanediol, $HOD_3H$, is more desirable than the methoxytrisiloxanol, $CH_3OD_3H$, since it has a higher hydroxyl content (14.2 percent vs. 6.7 percent). The methoxy group may have some effect, but it is less than that of the OH group. In the above formulas D represents the dimethylsiloxane unit, $(CH_3)_2SiO$.

It is preferred that the reaction mixture be homogeneous; otherwise the water tends to concentrate in one phase and the $D_3$ in the other phase. This leads to undesirable side reactions, notably polymerization of the $D_3$, e.g.,

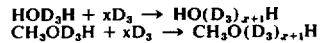

The mole ratio of water to $D_3$ should be about 1:1 although somewhat lower or higher ratios are permissible. The preferred range is from 0.5 to 2.0 moles of water per mole of $D_3$. Less water gives relatively little of the desired $HOD_3H$. More than 2 moles may be used but requires an excessive amount of methanol to maintain homogeneity.

The amount of methanol is not critical and may vary over a wide range. For example, one mole of water and one mole of $D_3$ require about 5.7 moles of methanol to provide a clear solution. The $D_3$ melts and dissolves completely on heating to about 55°C. A little less than 5.7 moles of methanol may be used satisfactorily; with good agitation the mixture becomes homogeneous as the reaction progresses. However, it is preferred to use at least 3 moles of methanol per mole of $D_3$, or 3 moles per mole of water, whichever is greater. A mixture of 5 moles of methanol to one of $D_3$ and one of water is very satisfactory. Larger amounts of methanol may be used but are not usually desired unless required to dissolve impurities in the $D_3$. In any case it is preferred to use no more than about 10 moles of methanol per mole of $D_3$ or water, whichever is greater.

Although best results are obtained with $D_3$ free of impurities, some impurities may be tolerated. The principal impurities found in industrially produced $D_3$ is octamethylcyclotetrasiloxane ($D_4$). For practical purposes $D_4$ is an inert impurity, as its rate of hydrolysis is much lower than that of $D_3$. Good results are obtained with $D_3$ which contains no visible liquid at room temperature. This corresponds to a level of no more than about 20 percent of occluded $D_4$. Although good results have been obtained with a slush of $D_3$ containing up to 50 percent of $D_4$, the higher amounts of $D_4$ are undesirable.

An undesirable impurity is a polydimethylsiloxane produced on prolonged storage of $D_3$ by the action of traces of acid or alkali. This shows up in the finished product as a viscous oil that floats on the surface. Preferably there should be less than one percent of this polymer in the $D_3$.

The hydrolysis is best carried out at a temperature at which all of the $D_3$ is in solution. Generally, this requires a minimum temperature of from 50° to 60°C. unless a large volume of methanol is employed. Higher temperatures, such as the reflux temperature, have been used with satisfactory results. Still higher temperatures may be used if desired, e.g., to achieve a rapid reaction without a catalyst. Pressure vessels are then required and temperatures as high as 100°C. or even 150°C. may then be used.

Generally, the reaction proceeds slowly without a catalyst. The reaction rate may be increased considerably by the use of selected acids and bases; however, strong acids and strong bases are not recommended as they promote side reactions such as condensation and equilibration. Weak acids, i.e., those having $pK_a$ values between 1.5 and 6 are satisfactory catalysts, provided they are removed when the desired reaction is completed or nearly completed. Weak bases may also be used, but generally they give more by-products than do weak acids. Water-soluble acids are particularly preferred as they are easily extracted at the end of the reaction. Among the acids that are suitable are the organic acids such as the lower fatty acids, e.g., formic acid and acetic acid; hydroxy acids such as glycolic and lactic; and polybasic acids such as malonic, succinic, tartaric, and citric. Salts of weak bases may also be used as catalysts. Whatever catalyst is chosen, the concentration should be such as to give a pH between 2 and 5. Although the reaction will proceed at pH values between 5 and 7, it is slow in this region. Catalyst concentrations in the range of 0.001 to 5 percent are usually adequate.

It is sometimes found that one or more of the reagents is contaminated with strong acid. This may lead to condensation reactions during mixing and heating to reaction temperature, especially if a large volume of material is being handled. As a safeguard it is recommended that a small amount of sodium bicarbonate be added to the methanol and water before the $D_3$ is added; sodium bicarbonate has very little catalytic activity of its own. Likewise, a small amount of a very weak acid may be added to neutralize alkali contamination. The catalyst is best added after the other ingredients have been heated to the desired temperature and the $D_3$ has dissolved.

The reaction time depends on the temperature, the dielectric constant of the medium (which is determined by the amounts of water and methanol) and the amount and nature of the catalyst. Other conditions being kept constant, reaction times may be varied between 10 minutes and 10 hours by the proper choice of catalyst.

It will be understood that, like other first-order reactions, the reaction is never 100 percent complete. Thus, if the half-life of $D_3$ is 10 minutes, it will be half consumed in 10 minutes, ¾ consumed in 20 minutes, ⅞ consumed in 30 minutes, and so forth. It is preferred to carry out the reaction to at least 75 percent completion to prevent crystallization of the remaining $D_3$. Maximum hydroxyl content is usually achieved after 85 to 95 percent completion. Prolonged heating after that leads to a gradual decline in hydroxyl content with relatively little change in $D_3$ content, possibly because the reaction is to some extent reversible. The term "reaction time" as used here means the time required to consume about 90 percent of the $D_3$.

At the end of the reaction period a volume of cold water equal to about 150 percent of the volume of the original mixture is added. This accomplishes several purposes. It cools the mixture, it stops the reaction by diluting and extracting the catalyst, and it extracts part of the methanol. When two distinct layers have formed the bottom layer is removed. Further extractions are carried out to remove the remaining methanol. Preferably the subsequent extractions are done with solutions containing sodium chloride and sodium bicarbonate as the density of the product approaches that of pure water when the methanol is removed. The sodium bicarbonate helps remove traces of the remaining acid catalyst. Generally 3 or 4 extractions are all that is necessary to remove the methanol.

The product is a mobile liquid generally having between 5 and 11 percent of silicon-bonded OH and between 2 and 4 percent of silicon-bonded $OCH_3$, as shown by nuclear magnetic resonance. The mole ratio of OH to $OCH_3$ is generally between 2.5 and 7.0. The principal ingredients are $HOD_3H$ and $CH_3OD_3H$ with minor amounts of $D_3$ and sometimes $D_4$, $D_5$, $D_6$ and linear siloxanes of up to 6 silicon atoms, as shown by gas chromatography.

The products of this invention are effective and efficient antistructure agents for silica-filled silicone elastomers. These silicone elastomers are prepared in the conventional manner, namely by curing at elevated temperatures heat-curable organopolysiloxanes containing these antistructure agents, vulcanizing agents, reinforcing and/or nonreinforcing fillers. The organopolysiloxanes useful in the invention are commonly referred to as dialkyl or alkylaryl polysiloxane gums. These organopolysiloxanes are well known in the art and methods for producing such materials are old and widely described in the literature. The curable organopolysiloxanes have recurring structural units of the general formula

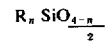

$$R_n SiO_{\frac{4-n}{2}}$$

where $n$ is a number of from about 1.9 to 2.2 and R represents monovalent hydrocarbon radicals such as alkyl, aryl, aralkyl, alkaryl, alkenyl, halogenated monovalent hydrocarbon radicals and cyano-substituted alkyl radicals. It is also desirable that in the curable organopolysiloxanes the majority of the R radicals be lower alkyl radicals, for example, methyl radicals. It is usually preferred that the organopolysiloxanes from which the curable compositions are prepared contain an average of from about 1.98 to about 2.2 organic groups, for instance, methyl groups or methylphenyl groups, etc., per silicon atom and that more than 98 percent of the silicon atoms of the polysiloxane contain two silicon-bonded organic groups, for instance, alkyl groups or a mixture of alkyl and aryl groups, etc., per silicon atom. Included specifically in this formula are the dimethylpolysiloxanes, methylphenylpolysiloxanes, methylvinylpolysiloxanes, and copolymers of such units, such as copolymers containing dimethyl-, diphenyl-, and phenylmethylsiloxane units and copolymers containing phenylmethyl-, dimethyl- and vinylmethylsiloxane units.

A sufficient amount of the above antistructure agents should be employed in these compositions to provide an OH content of at least 1 percent of the weight of the reinforcing filler. The amount required is more or less inversely proportional to the OH content. For example, if a formulation requires 18 parts of a "standard" softener of 2.5 percent OH it may be replaced with about 6 parts of a new softener having 7.5 percent OH. The resulting product shows all the desirable properties of the earlier product, both before and after curing. In terms of compression set the new product is better because a lower compression set is obtained with smaller proportions of softener. In general, the amount required is in the range of about 3 to about 12 parts per 100 parts of silicone gum depending on the OH content of the softener and the amount of high-surface silica used as a filler.

The new softeners may also be used to improve substandard softeners of, say, 1.5 to 2.0 percent OH by blending up to 2.5 percent or 3.5 percent OH. The blends are in every way equivalent to "standard" softeners containing 2.5 percent or 3.5 percent OH.

Finely divided fillers such as reinforcing and nonreinforcing fillers may be incorporated in the curable organopolysiloxane compositions. The amount of fillers used in combination with the organopolysiloxane polymers may be varied within wide limits, for instance, from about 10 to 300 percent by weight of fillers based on the weight of the organopolysiloxane polymers. The exact amount of fillers used will depend upon such factors as, for instance, the application for which the curable organopolysiloxane compositions are intended, the type of fillers employed, the density of the fillers, the type of curable organopolysiloxanes employed, etc. Obviously, mixtures of reinforcing fillers with nonreinforcing fillers may be employed.

Examples of suitable fillers which may be used are asbestos, clay, hydrated calcium silicate, zinc sulfide, silica aerogel, fumed silica, barium titanate, glass fiber, floc, iron oxide, bentonite, zinc oxide, nickelous oxide, magnesium oxide, micronized graphite, micronized slate, micronized mica, celite, lead oxide, titanium dioxide and calcium carbonate. Those having surface areas above 50 square meters per gram are generally classed as reinforcing fillers.

Various curing agents may be added to the organopolysiloxane compositions to effect rapid conversion of the compositions to an elastomeric state. Organic peroxides are particularly effective. Among such peroxides may be mentioned, for example, benzoyl peroxide, t-butyl perbenzoate, bis(2,4-dichlorobenzoyl) peroxide, dicumyl peroxide, dialkyl peroxides, such as di-t-butyl peroxide, etc. These curing agents may be present in amounts ranging from about 0.1 to as high as 4 to 8 percent by weight or even more based on the weight of the organopolysiloxane polymers.

The manner in which the antistructure agents of the present invention are utilized may be widely varied. The antistructure agents are preferably mixed with the organopolysiloxane gum just prior to or during the addition of the reinforcing and nonreinforcing fillers. Curing agents and other additives such as dyes, pigments and flame retardants, may be added to the organopolysiloxane compositions during the milling operation.

The embodiments of this invention are further illustrated by the following examples in which all parts are by weight unless otherwise specified.

EXAMPLE 1

To 480 parts (15 moles) of methanol, 54 parts (3 moles) of water and 0.1 part of sodium bicarbonate was added 666 parts (3 moles) of freshly distilled and still molten $D_3$ containing about 10 percent of $D_4$. The mixture was heated with stirring to 58°C. whereupon the $D_3$ that crystallized when first added dissolved. At this time 14 parts (0.3 mole) of formic acid was added. The temperature was maintained at 58° to 65°C. for 60 minutes. The mixture was then cooled by adding 1,800 parts of cold water as quickly as possible. Stirring was continued for 10 minutes, then the mixture was allowed to settle and the water was drawn off. After two additional extractions with water containing 5 percent of sodium chloride and 5 percent of sodium bicarbonate, the product was practically neutral (pH 7 to 8), clear, and colorless. Its viscosity was about 10.6 centistokes and its specific gravity at 25°C. was 0.973. Nuclear magnetic resonance indicated that only a trace of methanol was present. Nonvolatile matter, as indicated by weight loss under vacuum at 100°C. was only 13 percent. The OH content was 6.56 percent and the $OCH_3$ content 3.54 percent, the mole ratio of OH to $OCH_3$ being 3.28. Analysis by gas chromatography shows a variety of cyclic and linear siloxanes mostly in the range of 3 to 6 silicon atoms of which 28 percent was $HOD_3H$ and 21 percent was a mixture of $HOD_6H$ and $CH_3OD_6H$; no other siloxane over 13 percent was present.

EXAMPLE 2

A rate study was conducted at 65°C. using the same ratio of ingredients as in Example 1, except that a substantially pure grade of $D_3$ was used. Samples were taken at intervals, extracted as before and analyzed by gas chromatography. The results of the gas chromatographic analysis are illustrated in the following table.

| Reaction Time, Hours | OH, % | Percent of Volatile Fraction | | | | | |
|---|---|---|---|---|---|---|---|
| | | $D_3$ | $D_4$ | $HOD_3H$ | $CH_3OD_3H$ | $HOD_6H$ | Other |
| 0.5 | 7.15 | 17.8 | 0.2 | 60.9 | 18.4 | 2.7 | trace |
| 1.0 | 6.78 | 16.1 | 0.7 | 57.5 | 19.1 | 4.4 | 1.6 |
| 2.0 | 6.39 | 12.4 | 1.9 | 54.1 | 17.9 | 6.8 | 5.5 |
| 3.0 | 5.40 | 11.1 | 13.1 | 16.2 | 27.1 | 4.0 | 12.0 |

As the run proceeded the proportion of nonvolatile matter increased. The initial buildup of $HOD_6H$ indicates a simple condensation reaction. The subsequent formation of $D_4$ and other 4-silicon and 5-silicon species, listed as "Other" in the table, indicates a more extensive degradation, with some trend toward equilibration.

EXAMPLE 3

A rate study similar to that of Example 2 was carried out at 58°C. The results are given below.

| Reaction Time, Hours | OH, % |
|---|---|
| 0.5 | 7.53 |
| 1.0 | 7.00 |
| 2.0 | 6.76 |
| 3.2 | 5.75 |
| 4.0 | 5.73 |
| 5.0 | 5.72 |
| 6.0 | 5.61 |

It is apparent from these examples that little further reaction of the $D_3$ occurs after a half hour at either 58°C. or 65°C., but that condensation and equilibration reactions gradually reduce the OH content. The methoxy content also decreases but generally at a slower rate.

EXAMPLE 4

A mixture of 222 parts (1 mole) of $D_3$, 18 parts (1 mole) of water and 160 parts (5 moles) of methanol was heated to reflux (68.5°C.) and 6 parts (0.1 mole) of acetic acid was added. Reflux and stirring were continued for 17 hours while the temperature rose slowly to 71.2°C. Then 500 parts of water were added to stop the reaction. After 5 extractions with 5 percent sodium chloride in water, the product was neutral and free of methanol. It then contained 6.75 percent OH and 5.15 percent of $OCH_3$, the mole ratio of OH to $OCH_3$ being 2.5.

EXAMPLE 5

A formulation containing 100 parts of a polydimethylsiloxane gum containing 0.2 mole percent of methylvinylsiloxane, 40 parts of fumed silica (Cab-O-Sil), 8 parts of the antistructure agent prepared in Example 1 and 1.4 parts of bis(2,4-dichlorobenzoyl) peroxide was milled for 1 hour until it acquired a smooth, uniform consistency, molded at a press-cure temperature of 115°C. for 5 minutes at 600 psi and then postcured for 4 hours at 200°C. in a circulating air oven.

EXAMPLE 6

In a comparison example, 8 parts of an antistructure agent (OH-terminated polydimethylpolysiloxane) having 2.5 percent OH was substituted for the antistructure agent of Example 1. The resulting composition was extremely difficult to mill and had a short shelf life before refreshening was required, whereas the composition containing the antistructure agent of Example 1 required very little milling and had a long shelf life. Also, the cured composition had a higher hardness than the cured composition containing the antistructure agent of Example 1.

Although specific examples are mentioned and have been herein described it is not intended to limit the invention solely thereto but to include all the variations and modifications falling within the spirit and scope of the appended claims.

I claim:

1. A heat curable organopolysiloxane composition composed of an organopolysiloxane polymer, an organic peroxide curing agent, a reinforcing filler and a sufficient amount of an antistructure agent to provide an OH content of at least 1 percent of the weight of the filler, said antistructure agent comprising a mixture of hexamethyltrisiloxane-1,5-diol and 1-methoxy-hexamethyltrisiloxane-5-ol, in which the hydroxyl content is between 5 and 11 percent, the methoxy content is between 2 and 4 percent, and the mole ratio of hydroxyl to methoxy is between 2.5 and 7.

2. The composition of claim 1 wherein the organopolysiloxane polymer has recurring structural units of the formula $$R_n SiO_{\frac{4-n}{2}}$$

where R is selected from the group consisting of monovalent hydrocarbon radicals, halogenated monovalent hydrocarbon radicals and cyanoalkyl radicals and n is a number of from about 1.9 to 2.2.

* * * * *